United States Patent [19]

Brannon et al.

[11] Patent Number: 4,683,254
[45] Date of Patent: Jul. 28, 1987

[54] SIZE COMPOSITIONS FOR GLASS FIBERS

[75] Inventors: Robert C. Brannon, Newark, Ohio; Donald B. Sage, Jr., Jackson, Tenn.; David G. Miller, Pataskala, Ohio

[73] Assignee: Owens-Corning Fiberglas Corporation, Toledo, Ohio

[21] Appl. No.: 789,894

[22] Filed: Oct. 21, 1985

[51] Int. Cl.$^4$ ................................................ C08K 5/54
[52] U.S. Cl. .................................. 523/503; 428/378; 428/392; 523/504
[58] Field of Search ................ 428/378, 392; 523/503, 523/504; 524/238, 264, 513

[56] References Cited

U.S. PATENT DOCUMENTS

| 4,029,623 | 6/1977 | Maaghul | 523/504 |
| 4,341,877 | 7/1982 | Das | 428/378 |
| 4,367,301 | 1/1983 | Brannon | 428/378 |
| 4,370,157 | 1/1983 | Barch | 428/378 |
| 4,396,676 | 8/1983 | Brannon | 524/238 |

Primary Examiner—Paul R. Michl
Attorney, Agent, or Firm—Ronald C. Hudgens; Patrick P. Pacella

[57] ABSTRACT

An aqueous size composition has been developed for glass fibers produced for molded products having appearance surfaces known as Class A surfaces. The size contains a cure stable polyester emulsion and a static insensitive lubricant system. The resulting coated glass fibers are especially useful in improving processability and product uniformity of SMC applications.

15 Claims, 4 Drawing Figures

SURFACTANT STABILITY

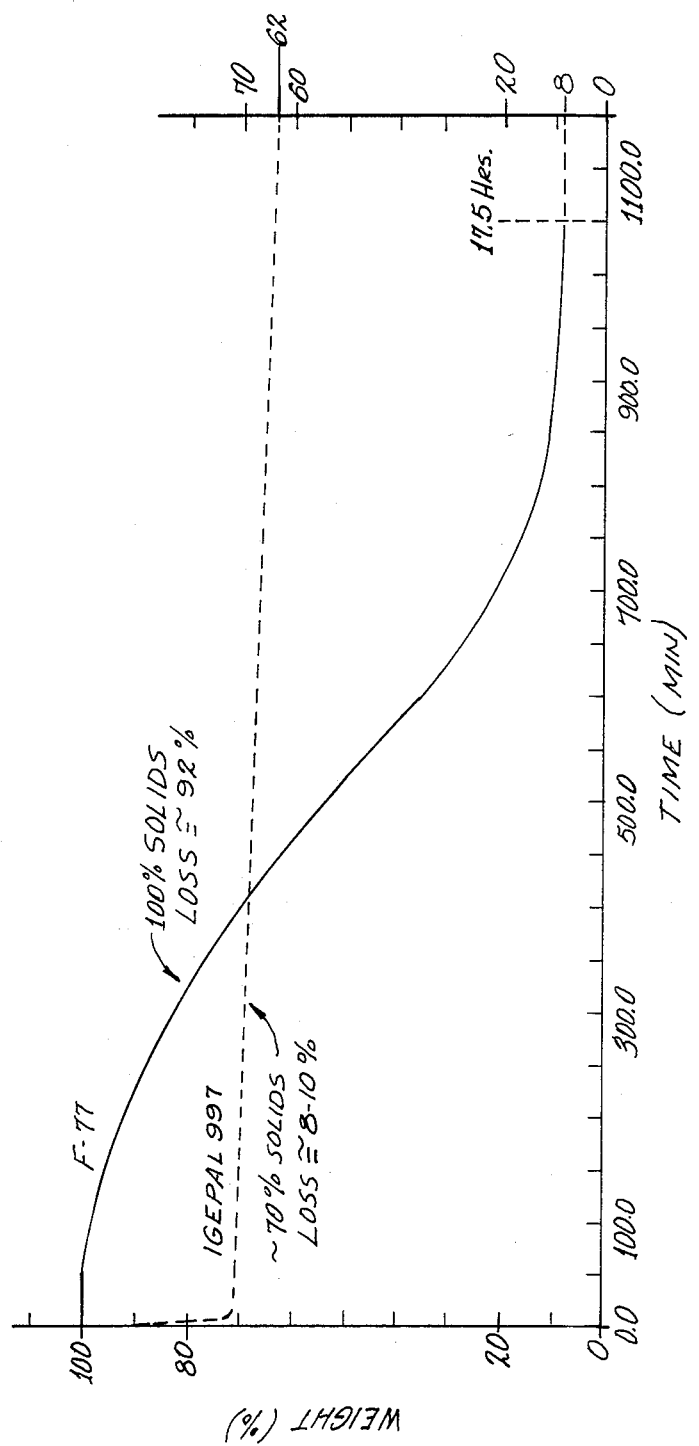

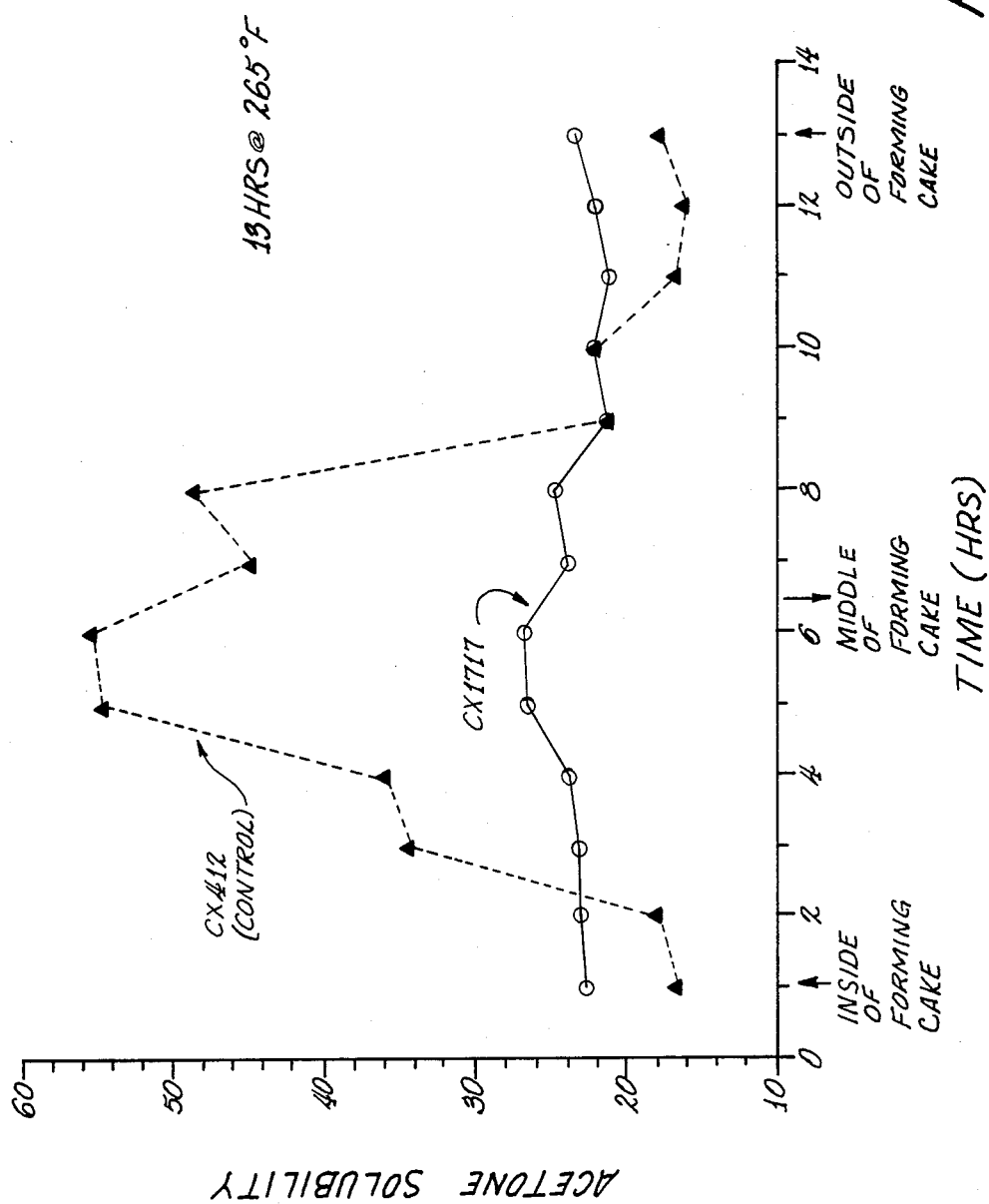

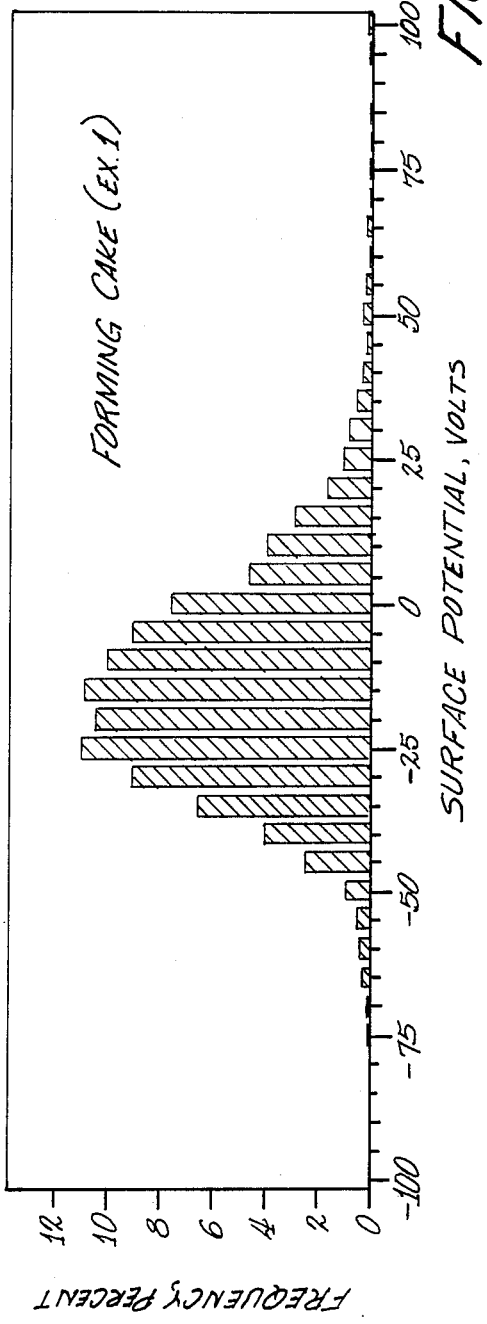
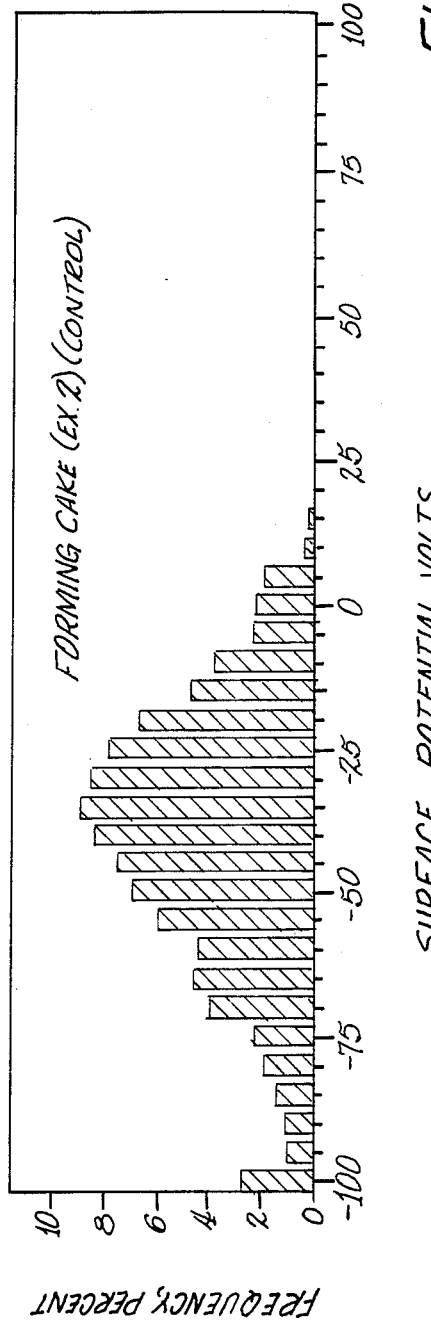

SIZE COMPOSITIONS FOR GLASS FIBERS

TECHNICAL FIELD

This invention relates to size composition for glass fibers. The size compositions are intended for glass fibers produced for incorporation in molding compounds.

BACKGROUND ART

The use of unsaturated polyester compounds in combination with thermoplastic resins and fillers to produce molding compositions is well known. These compositions, intended to polymerize when molded under heat and pressure, are generally combined with fillers and chopped glass, produced from roving, to produce molded products having appearance surfaces with a minimum of irregularities or undulations known as Class A surfaces.

The use of chopped glass as reinforcement in such molding compounds is well known. The chopped glass is produced in the form of individual strands which are sized, gathered into rovings, chopped to the desired length and incorporated into the resin composite prior to molding.

The sizes generally comprise a polyester emulsion base, a lubricant, film formers and the like and are extremely important in imparting to the reinforcing glass its ability to be wetted out by the molding compound. These sizes are also important in that they protect the glass in its handling subsequent to being sized and are influential in minimizing the amount of fuzz and fly which is produced on the glass, the fuzz and fly having a decided affect upon the appearance surface of the molded product.

The sized glass fibers generally are employed as reinforcement for sheet molding compounds (SMC) and bulk molding compounds (BMC).

DISCLOSURE OF INVENTION

According to this invention, we have provided an improved polyester-based size. We employ a cure stable polyester emulsion and a static-insensitive lubricant system. The formulation provides for very low static generation which allows antistatic methods to work better even at low relative humidity. The sized glass fibers are particularly suitable for use in sheet molding compounds.

Unsaturated polyesters useful in this invention typically contain a polyesterification product of one or more ethylenically unsaturated dicarboxylic acids or anhydrides such as maleic or fumaric with one or more glycols such as ehtylene or propylene glycol and, sometimes, minor proportions of other aromatic or aliphatic mono- or dicarboxylic acids or anhydrides and/or other mono- or polyhydroxyl compounds. They also typically contain an ethylenically unsaturated monomer, such as styrene, copolymerizable with the unsaturated polyester for curing.

BRIEF DESCRIPTION OF THE DRAWINGS

FIG. 1 is a graph showing surfactant stability as measured by isothermal thermogravimetric weight loss.

FIG. 2 is a graph showing acetone solubility through the forming cake.

FIG. 3 shown electrostatic data obtained from the size of Example 1.

FIG. 4 shows electrostatic data obtained from the control size of Example 2.

BEST MODE OF CARRYING OUT THE INVENTION

This invention comprises an aqueous size composition comprising, approximately, on a weight percent basis:

|   | Weight Percent |
|---|---|
| Cure, stable polyester emulsion | 50–55 |
| Polyvinylacetate copolymer | 40–45 |
| Glacial acetic acid | 0–0.3 |
| Silane | 2–4 |
| Static insensitive lubricant | 0.05–2 |
| Wax | 0–3 |
| Water | Balance |

Final solids content ranges from 10 to 15 percent. The sizing composition is applied so as to deposit a dried size coating on the fibers corresponding to about 0.2 to 3.0 weight percent of the weight of the fibers (LOI).

Preferably, the size composition is prepared according to the following formulation:

|   | Weight Percent |
|---|---|
| Cure, stable polyester emulsion | 51.5–53.5 |
| Polyvinylacetate copolymer | 41.5–43.5 |
| Glacial acetic acid | 0–0.3 |
| Silane | 2–3 |
| Static insensitive lubricant | 0.05–1 |
| Wax | 0–2 |
| Water | Balance |

Preferably, final solids content ranges from 11 to 14 percent. The sizing composition is applied so as to deposit a dried size coating on the fibers corresponding to about 0.2 to 2 weight percent of the weight of the fibrs (LOI).

The unsaturated polyesters are primarily polyesterification products of an ethylenically unsaturated dicarboxylic acid or anhydride such as maleic acid or anhydride (which will ordinarily and preferably be at least partially isomerized to the fumarate form during the polyesterification) and a glycol such as ethylene or propylene glycol or the corresponding epoxide. Minor molar proportions of other acid and/or hydroxyl reactants can be incorporated, if desired, according to generally accepted practice. For example, the reactivity of the polyester in the addition copolymerization reaction involved in curing can be reduced by substituting a dicarboxylic acid or anhydride not having any ethylenic unsaturation for a minor molar proportion of the ethylenically unsaturated dicarboxylic acid or anhydride. Either aliphatic or aromatic substitutes may be employed, the most common probably being isophathalic acid. Minor molar proportions of monofunctional carboxylic acid or alcohol reactants can also be incorporated; these can serve not only to modify the reactivity of the resultant polyester and its compatibility with other size components but can also be employed to control its acid and/or hydroxyl value independently of its average molecular weight.

The cure stable polyester emulsion is a conventional unsaturated polyester emulsified with nonylphenoxypoly (ethyleneoxy) ethanol. One such material is Igepal CO-997 from GAF. This surfactant does not degrade during drying and does not interfere with the cure of the polyester resin.

The control resin used in the following examples is a conventional unsaturated polyester emulsified with a block co-polymer of polyoxyethylene and polyoxypropylene. One such material is Pluronic ® F-77 from BASF.

Both the cure stable polyester emulsion of this invention, CX1717 from Ownes-Corning Fiberglas and the control polyester emulsion of Example II, CX412 from Ownes-Corning, are prepared from Ownes-Corning E-400 polyester resin. E-400 is a conventional polyester resin prepared from phthalic anhydride (26%), maleic anhydride (17%), propylene glycol (28%) and styrene (27%). The balance being CO-997 for the present invention versus F-77 for the control emulsion, and very small amounts of toluhydroquinone and p-benzoquinone inhibitors.

The static insensitive lubricant is a combination of cocoa amine acetate and a polyethyleneimine. We selected this chemistry to obtain low fuzz during SMC processing without affecting cure of the polyester of PVAC film formers.

The pH of the size typically ranges from 2 to 4 and preferably is about 3.

EXAMPLE I

An inventive size composition prepared from the following ingredients.

|  | Weight Percent |
| --- | --- |
| Cure stable polyester emulsion; CX1717 from Owens-Corning Fiberglas | 52.31 |
| Polyvinylacetate copolymer; National Starch 25-2828 | 42.80 |
| Gamma-methacryloxy-propyltrimethoxysilane; Union Carbide A-174 | 2.94 |
| Cocoa amine acetate; Alkaril PF-710 | 0.25 |
| polyethyleneimine; Emery 6760u | 0.25 |
| Carbowax; Union Carbide C-1000 | 1.45 |
| Deionized water | Balance |

Final solids content was about 14 weight percent. The sizing composition is applied so as to deposit a dried size coating on the fibers corresponding to about 2 weight percent of the weight of the fibers (LOI).

EXAMPLE II (Control)

A control size composition was prepared from the following ingredients.

|  | Weight Percent |
| --- | --- |
| Conventional polyester emulsion; Owens-Corning Fiberglas 412 | 64.33 |
| Polyvinylethylene emulsion; Air Products A400 | 15.20 |
| Polyvinylacetate copolymer; National Starch 25-2828 | 13.98 |
| Gamma-methacryloxy-propyltrimethoxysilane; Union Carbide A-174 | 2.85 |
| Cirrasol 185AE/AN; pelargonic acid and tetraethylenepentamine | 2.22 |
| Carbowax; Union Carbide C-1000 | 1.41 |
| Deionized water | Balance |

The percent solids in the size composition was about 13. The strand solids corresponded to about 2 weight percent of the weight of the fibers (LOI).

INDUSTRIAL APPLICABILITY

EXAMPLE III

The size of Example I and the control size of Example II were prepared by conventional size preparation methods and applied to the glass strand using conventional application techniques. The incorporation of the sized strands into the resin composition is performed by conventional methods.

Glass fibers used in the practice of this invention can be, but are not restricted to "E" glass fibers, well known to those skilled in the art. Such fibers are described in U.S. Pat. No. 2,334,961.

Strands of glass fibers are produced by pulling several hundred or more tiny molten streams of glass which issue from holes in the bottom of a bushing over a size applying apron to a gathering shoe which groups the fibers together into a strand. This strand then proceeds to a traverse mechanism and winding drum which provides the pulling action which attenuates the molten glass and coils the strand into a package. The fibers are individually separated at the time that they pass over the size applicator, so that the surfaces of the fibers are substantially completely coated before they are drawn together into a strand. This size acts as a lubricant which separates the individual filaments, and if the filaments are not separated by the size, they will scratch each other and break as they are flexed and drawn over guide eyes or other contact surfaces in subsequent operations such as roving or SMC compounding.

EXAMPLE IV

Glass fibers coated with the size of Example I and the control size of Example II were compared as follows.

FIG. 1 shows the thermal stability in air of Igepal CO997 vs. control F77 surfactant. The inventive surfactant only loses about 8 to 10% solids over 17.5 hours at 130° C. (265° F). The control surfactant lost about 92% solids under the same conditions.

FIG. 2 shows the acetone solubility for the sized glass fibers of this invention vs. the control product dried over 13 hours at 130° C. (265° F.). The inventive size consistently had lower solubility at various positions through the forming cake. Consistency of cure through the forming cake is due to the improved thermal stability of CO997 surfactant relative to F77. The forming cakes are terms used to identify strands of sized glass fibers prior to further finishing operations. The effectiveness of the Igepal ® surfactant in controlling solubility and cure of the polyester film former is apparent from this data.

Electrostatic properties were obtained on forming cakes made from each of the sizes in Examples 1 and 2. In this test, a single strand from a forming cake is triboelectrically charged by a constant friction device and monitored for residual charge with an electrostatic probe. Both generation and dissipation mechanisms are characterized by this method. The monitored charged is converted to a relative frequency histogram, which includes several strands from the same forming cake.

The static data for Examples 1 and 2 are shown in FIGS. 3 and 4, respectively. The inventive product reduces the amount of highly charged negative surface potential. This results in a more narrow charge distribution and a nominal charge which is closer to zero. Both of these factors improve static performance during SMC processing. Static buildup on chopper surfaces is reduced, and uniformity of the chopped glass bed is improved.

We claim:

1. An aqueous size composition consisting essentially of, by weight percent:

|  | Weight Percent |
| --- | --- |
| A cure, stable polyester emulsion of an unsaturated polyester emulsified with nonylphenoxypoly (ethyleneoxy) ethanol | 50–55 |
| Polyvinylacetate copolymer | 40–45 |
| Acetic acid | 0–0.3 |
| Silane | 2–4 |
| Static insensitive lubricant | 0.05–2 |
| Wax | 0–3 |
| Water | Balance |

2. The size composition of claim 1 having a final solids content ranging from 10 to 15 weight percent.

3. An aqueous size composition consisting essentially of, by weight percent:

|  | Weight Percent |
| --- | --- |
| A cure, stable polyester emulsion of an unsaturated polyester emulsified with nonylphenoxypoly (ethyleneoxy) ethanol | 51.5–53.5 |
| Polyvinylacetate copolymer | 41.5–43.5 |
| Acetic acid | 0–0.3 |
| Silane | 2–3 |
| Static insensitive lubricant | 0.05–1 |
| Wax | 0–2 |
| Water | Balance |

4. The size composition of claim 2 having a final solids content ranging from 11 to 14 weight percent.

5. The size composition of claim 1 wherein the static insensitive lubricant is the combination of cocoa amine acetate and a monoamide.

6. An aqueous size composition consisting essentially of, by weight:

|  | Weight Percent |
| --- | --- |
| A cure, stable polyester emulsion of an unsaturated polyester emulsified with nonylphenoxypoly (ethyleneoxy) ethanol | 52.31 |
| Polyvinylacetate copolymer | 42.80 |
| Gamma-methacryloxy-propyltrimethoxysilane | 2.94 |
| Cocoa amine acetate | 0.25 |
| Polyethyleneimine | 0.25 |
| Carbowax | 1.45 |
| Deionized water | Balance |

7. The size composition of claim 6 having a final solids content of about 14 weight percent.

8. A plurality of filaments at least a portion of the filaments' surfaces being coated with the residue produced by evaporating water from an aqueous size composition of claim 1.

9. A plurality of filaments, at least a portion of the filaments' surfaces being coated with the residue produced by evaporating water from an aqueous size composition of claim 3.

10. A plurality of filaments, at least a portion of the filaments' surfaces being coated with the residue produced by evaporating water from an aqueous size composition of claim 6.

11. A plurality of filaments according to claim 8 wherein the filaments are made of glass fibers.

12. A resinous article reinforced with the filaments of claim 8 imbedded in the matrix resin thereof.

13. A resinous article reinforced with the glass fibers of claim 11 imbedded in the matrix resin thereof.

14. Sheet molding compound prepared from the coated glass fibers of claim 11 and unsaturated polyester resin.

15. Sheet molding compound according to claim 14 including thermoplastic resins and fillers.

* * * * *